United States Patent

[11] 3,603,545

[72] Inventor Roy Boniface
London, England
[21] Appl. No. 5,053
[22] Filed Jan. 22, 1970
[45] Patented Sept. 7, 1971
[73] Assignee Ernest F. Moy Limited
London, England
[32] Priority Jan. 24, 1969
[33] Great Britain
[31] 4157/69

[54] TILT-TABLE DEVICE
11 Claims, 5 Drawing Figs.
[52] U.S. Cl. .................................................. 248/184,
95/86, 108/8, 248/284, 248/371
[51] Int. Cl. ...................................................... G03b 17/56,
F16m 11/12
[50] Field of Search ............................................ 248/184,
284, 371, 398, 138, 178; 95/86; 108/6, 7, 8

[56] References Cited
UNITED STATES PATENTS
| | | | |
|---|---|---|---|
| 1,897,321 | 2/1933 | Mitchell et al. ............... | 108/8 X |
| 2,516,582 | 7/1950 | McCullough ................ | 95/86 X |
| 2,639,541 | 5/1953 | Le Tang ...................... | 108/7 |
| 2,724,988 | 11/1955 | Peters ......................... | 248/184 X |

FOREIGN PATENTS
943,046 11/1963 Great Britain................ 95/86

Primary Examiner—J. Franklin Foss
Attorney—Raphael Semmes

ABSTRACT: A device for adjusting the angle of tilt of a camera has a table connected to a base below the table by an intermediate plate, one end of the intermediate plate being pivotally connected to the base about a horizontal first axis and the other end being pivotally connected to the table about a second axis parallel to the first axis. A locking bar is mounting on the intermediate plate and is axially slidable in one direction into locking engagement with the base and in the opposite direction into locking engagement with the table. An expandable jack is mounted on the base and is operable to exert on the table an upward thrust, the line of action of which passes between the two axes. The camera is mounted on the table. When the intermediate plate is locked to the base operation of the jack pivots the table about the second axis and thereby tilts the camera upward. When the intermediate plate is locked to the table operation of the jack pivots the table and intermediate plate about the first axis and thereby tilts the camera downwards. The base may have arcuate quadrants centered about a common horizontal axis and mounted on rollers on a support for rocking movement about the common axis.

TILT-TABLE DEVICE

THIS INVENTION relates to a tilt-table device for mounting a camera at different angles of tilt relative to a support.

According to the invention there is provided a tilt-table device for a camera comprising a base adapted to be mounted on a support, an intermediate member pivotally connected to the base about a substantially horizontal first axis, a table pivotally connected to the intermediate member about a second axis spaced from and substantially parallel to the first axis, the table being adapted to support a camera, locking means operable selectively either to lock the intermediate member to the base to prevent relative angular movement therebetween about the first axis or to lock the intermediate member to the table to prevent relative angular movement therebetween about the second axis, and tilting means operable to pivot the table about the second axis when the intermediate member is locked to the base by the locking means, and to pivot both the table and the intermediate member about the first axis when the intermediate member is locked to the table by the locking means.

The tilt-table device of the invention can be of simple construction but nevertheless provide a very wide angle of adjustment of tilt to a camera both upwards and downwards. Moreover it may be constructed so that it can be collapsed into a compact assembly with the base, intermediate member and table superimposed directly on one another when not in use.

The locking means preferably comprises a locking member mounted on the intermediate member and movable in one direction into locking engagement with the base at a particular setting of the intermediate member relative to the base to prevent relative angular movement therebetween about said first axis, and the locking member being movable in the opposite direction into locking engagement with the table at a particular setting of the table relative to the intermediate member to prevent relative angular movement therebetween about said second axis.

The tilting means preferably comprises an expandable jack disposed between and reacting against the base and the table with the line of action of the jack passing between the first and second axes.

The table of the device may of course be of any suitable construction, and may if desired consist of an open framework to which the camera can be secured.

The tilt-table device is particularly suitable for use in a camera head for supporting a television or film camera to permit the camera to follow smoothly a moving object. Camera heads have hitherto generally comprised a main frame and a platform secured on two arcuate guide rails centered on a horizontal axis passing through a camera mounted on the platform, the arcuate guide rails being supported on rollers in the frame so as to permit the platform and guide rails to pivot about the horizontal axis. The guide rails are usually provided with teeth engageable with pinions which can be rotated by hand wheels to adjust the angle of tilt of the platform. Such toothed guide rails are usually referred to as quadrant. In a case in which it was desired to tilt the camera at a greater angle than that obtainable with the quadrants alone, it was necessary to mount the camera on a wedge shaped block on the platform to provide a preset additional tilt in the required sense. The removal and refitting of a camera on a wedge block on a camera head is however a lengthy operation, particularly with television cameras which are heavy and bulky.

According to the invention there is also provided a camera head fitted with a tilt-table device as set forth above, the camera head having means for adjusting the angle of tilt of the device, and the device being adjustable to provide an additional preset tilt to the table to which a camera may be secured.

One construction of a tilt-table device according to the invention and adapted to form part of a camera head will now be described, by way of example, with reference to the accompanying drawings, in which.

Figure 1:
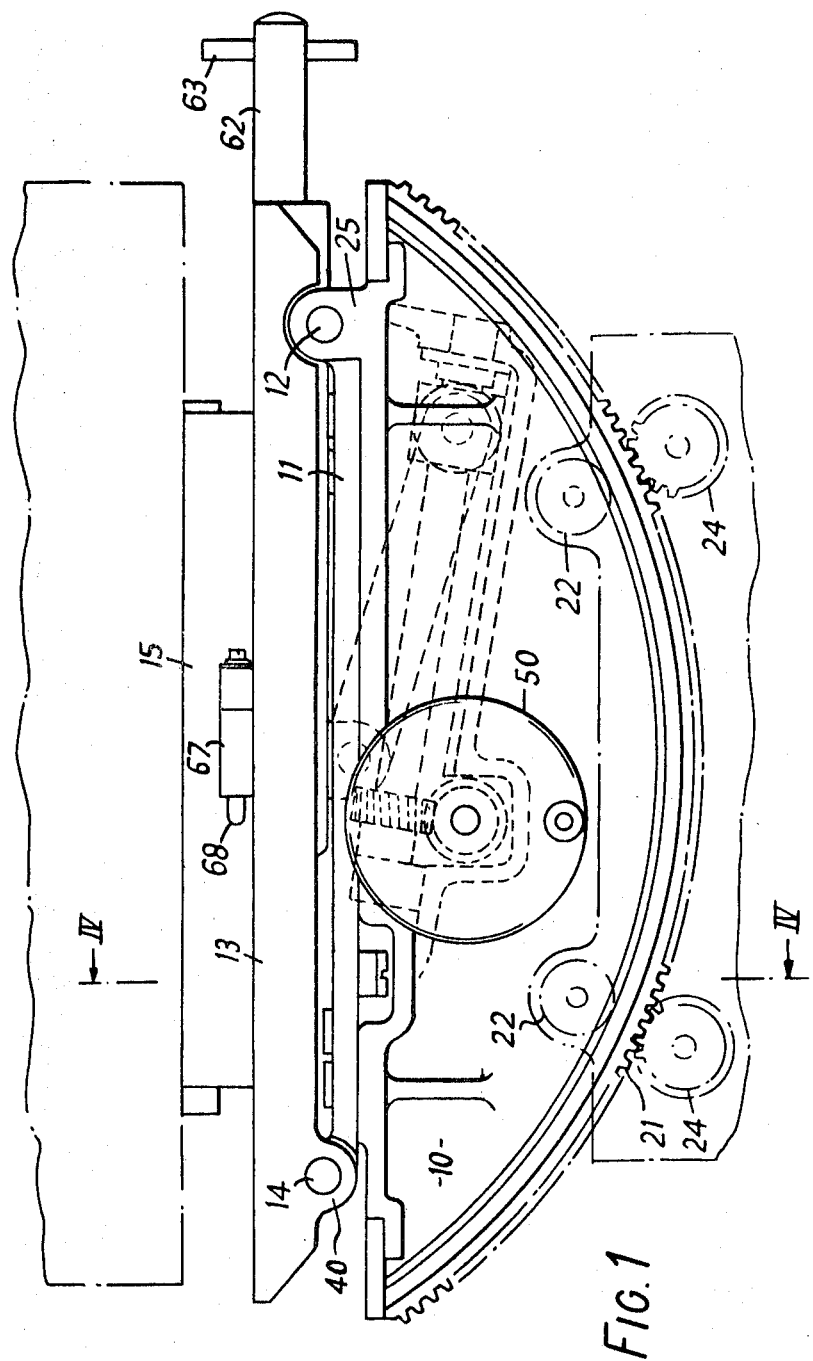
FIG. 1 is a side elevation of the device, showing in phantom lines the part of the camera head supporting the device and part of a camera mounted on the device.

Referring to the drawings, the tilt-table device comprises a base 10, an intermediate plate 11 having its rear end pivotally connected by hinge pin 12 to the rear end of the base, a top plate 13 having its front end pivotally connected by a hinge pin 14 to the front end of the intermediate plate 11, the pins 12 and 14 being parallel to one another, an adapter plate 15 mounted on the top plate 13, a locking bar 16 (FIG. 2, 3) axially movable to lock the intermediate plate either to the base or to the top plate, and screw-operated tilt mechanism 17 adapted to pivot the top plate about either of the pins 12, 14. The top plate forms the table of the device and the adapter plate has means for securing a camera thereto.

Figure 4:
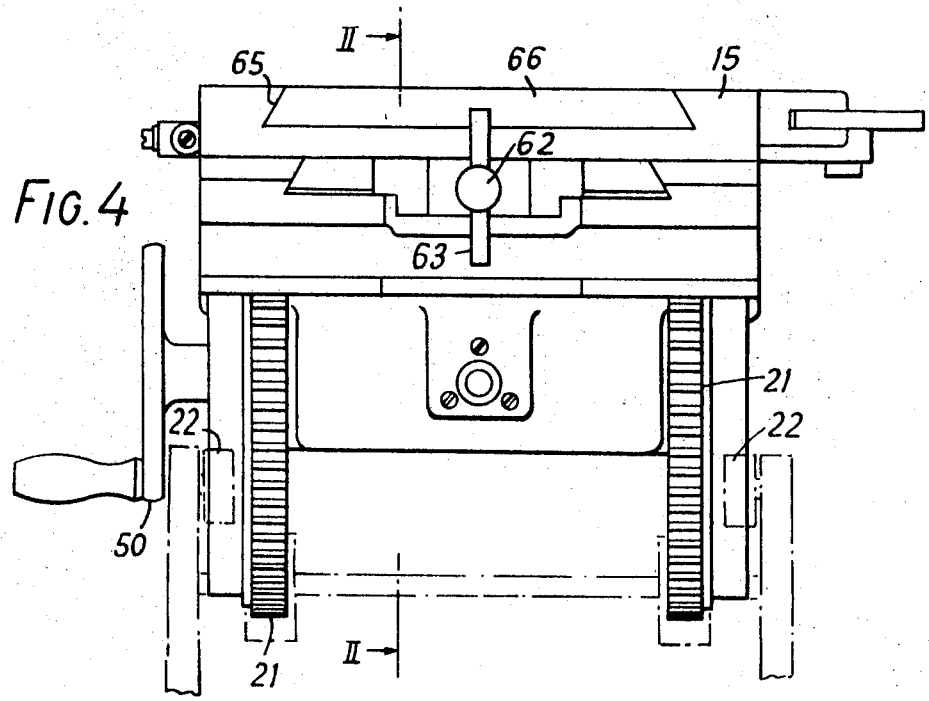
FIG. 4 is a rear end elevation view of the device.
Figure 5:
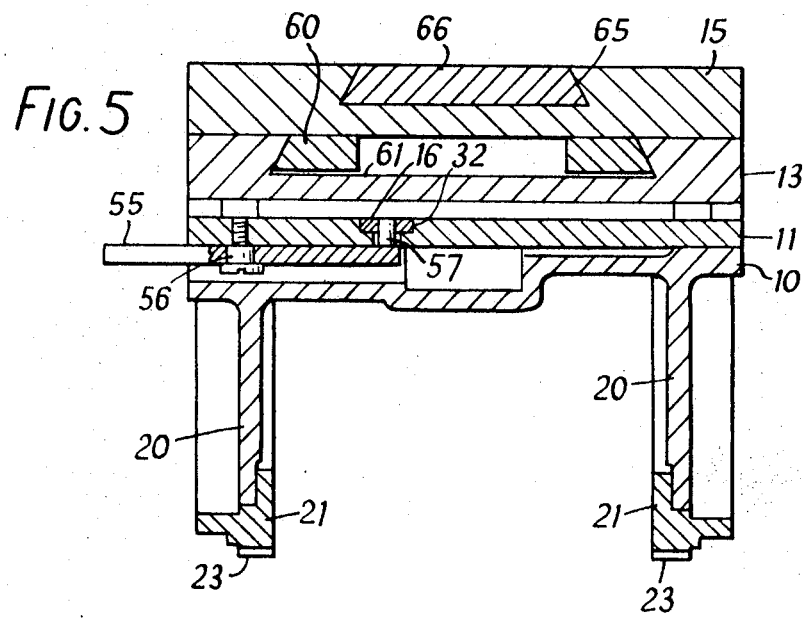
FIG. 5 is a sectional view taken on the line IV—IV in FIG. 1.

The base 10 has two depending flanges 20 (FIG. 5) arranged one on each side, each flange having an arcuate periphery fitted with a toothed quadrant 21. The toothed quadrants cooperate with pinions and rollers in a camera head in conventional manner so that the base is angularly movable about the common axis of the two quadrants upon rotation of the pinions. The mechanism for supporting and driving such toothed quadrants in a camera head is well known and has therefore not been illustrated in detail, but FIGS. 1 and 4 show in phantom lines the rollers 22 which engage the inside surfaces of the quadrants to hold their teeth 23 in engagement with the drive pinions 24.

The base 10 is also provided at its rear end with two spaced bearing lugs 25 to receive the hinge pin 12, and with an upstanding lug 26 adjacent its front end. The base is shaped to form a well 27, the bottom of which forms an inclined track 28 for a carriage of the tilt mechanism.

The intermediate plate 11 has two spaced bearings lugs 30 at its rear end to receive the hinge pin 12 and two spaced bearing lugs 31 at its front end to receive the hinge pin 14. The top surface of the intermediate plate is provided with a longitudinal groove 32 (FIG. 5) which receives the locking bar 16 as a sliding fit, the bar 16 being held in the groove by front and rear straps 33, 34 secured to the plate 11 and extending across the groove.

The front end of the groove 32 terminates at an aperture 35 adapted to receive the lug 26, and the rear end of the groove terminates at a further aperture 36 (FIG. 3) adapted to receive a downwardly projecting lug 37 on the top plate.

The top plate 13 is provided at its front end with two depending bearing lugs 40 to receive the hinge pin 14, and with two pairs of depending bearing lugs 41 arranged side by side at the center of the top plate, the lugs 41 being pivotally connected to the upper ends of two arms 42 of the tilt mechanism. The two arms are arranged side by side so that only one arm is shown in FIGS. 1–3.

The tilt mechanism comprises a carriage 43 having side wheels 44 arranged to roll along the track 28 at the bottom of the well in the base, a screw rod 45 extending through a nut fixed on the carriage, the screw rod being rotatably mounted at its ends in bearings 46, 47 on the base, a worm wheel 48 fixed on the screw rod 45 and a worm 49 rotatable by a hand wheel 50 on the side of the base. The two arms 42 extend downwards through apertures in the intermediate plate and are pivotally connected to opposite sides of the carriage.

The locking bar 16 has a length slightly greater than the groove 34 in the intermediate plate and is axially movable within the groove by a transverse lever 55 (FIG. 5) which projects out from the side of the device. The lever 55 is pivotally mounted intermediate its ends on a pin 56 secured to the underside of the intermediate plate, and the inner end of the lever has an upstanding pin 57 which extends through a slot in the intermediate plate and is engaged in an aperture in the locking bar. Pivotal movement of the lever 55 by an operator grasping the outer end thereof will thus cause axial movement of the locking bar within its groove.

Figure 2:
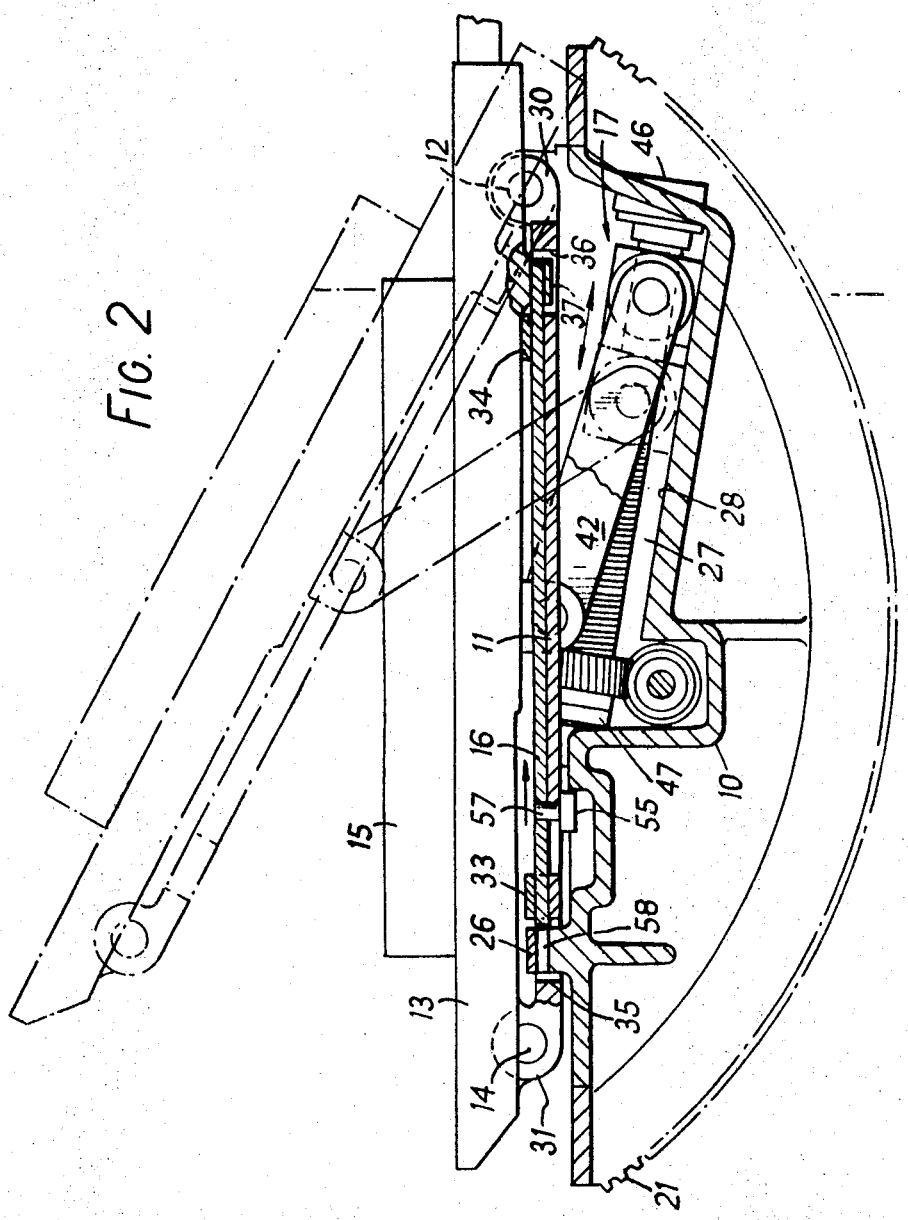
FIg. 2 is a part-sectional side elevation of the device, shown in the collapsed position in full lines an in the upward tilt position in phantom lines.
Figure 3:
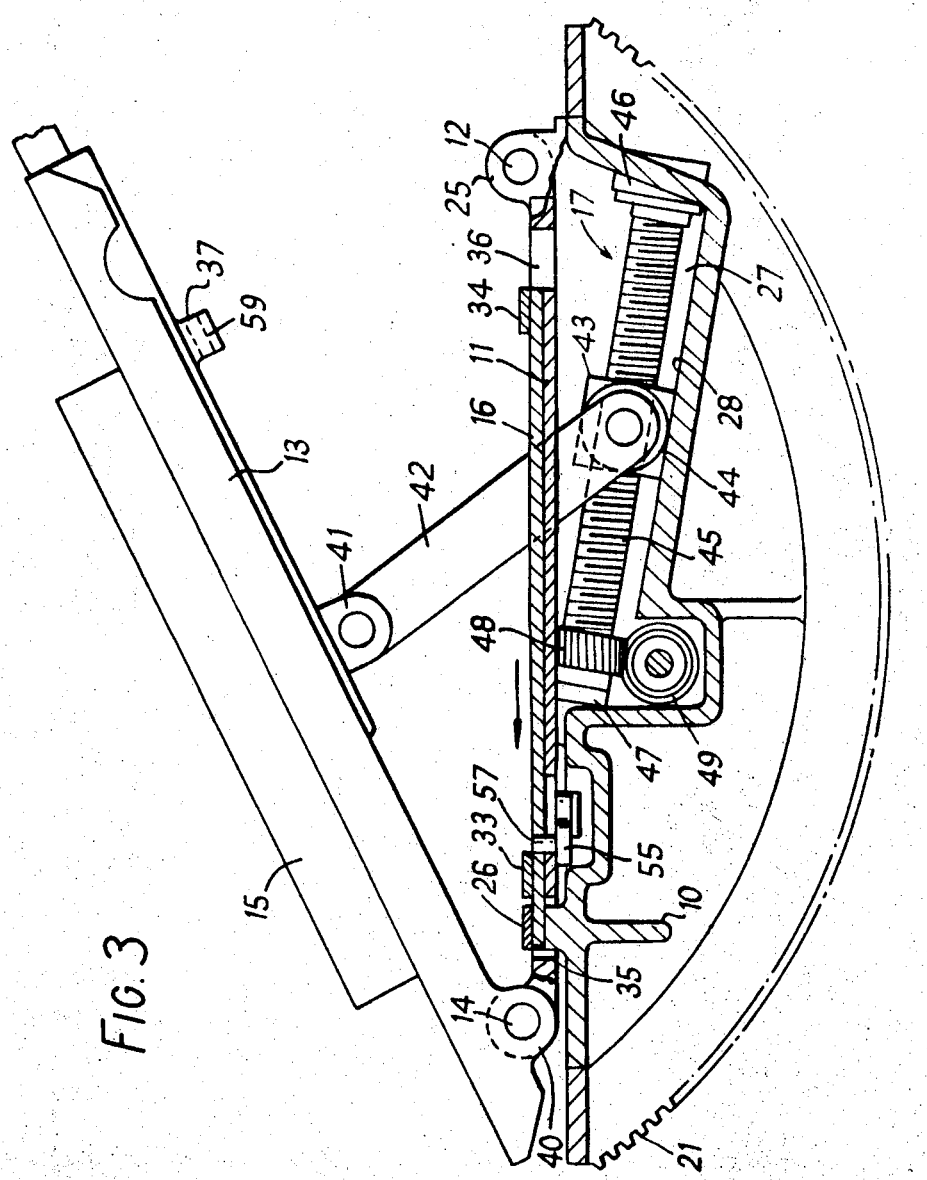
FIG. 3 is a part-sectional side elevation of the device in the downward tilt position.

When the device is in the collapsed position shown in full lines in FIGS. 1 and 2, the lug 26 on the base projects through the aperture 35 in the intermediate plate and the lug 37 on the top plate projects through the aperture 36 in the intermediate plate. The two lugs 26, 37 are provided with apertures 58, 59 respectively to receive the adjacent ends of the locking bar, and the locking bar is arranged so that when the front end is engaged in the aperture 58 in lug 26 the rear end is clear of the aperture 59 in lug 37, and when the rear end of the locking bar is engaged in the aperture 59, the front end is clear of the aperture 58. When the device is in the fully collapsed position, the carriage IS at the rear end of track 28 as shown in FIG. 2.

When the device is in the fully collapsed position, the top plate may be tilted upwards as shown in broken lines in FIG. 2 by moving the locking bar rearwards into engagement with the aperture 59 in lug 37, thereby locking the intermediate plate to the top plate. In this position of the locking bar the intermediate plate is released from the base. The carriage is then driven up the track 28 by rotation of the handwheel 50, so that the arms 42 swing the top plate together with the intermediate plate upwards about the hinge pin 12.

To tilt the top plate downwards, the carriage is first moved rearwards to its fullest extent so as to collapse the top plate and intermediate plate on to the base, and the locking bar is then moved out of the aperture 59 and into the aperture 58, thereby releasing the intermediate plate from the top plate and locking it to the base. The carriage is then again driven up the track 28 by rotation of the handwheel 50, so that the arms 42 swing the top plate about the hinge pin 14 into the downwardly inclined position shown in FIG. 3.

The adapter plate 15 has a dovetail slide 60 mounted in a corresponding axial groove 61 in the upper surface of the top plate 13, the adapter plate being movable along the groove 61 by a threaded rod 62 rotatably mounted on the top plate and engaged in a nut in the adapter plate. The screwed rod 62 is rotatable by a handle 63 on the end of the rod. Adjustment of the adapter plate forwards and rearwards on the top plate enables the weight of a camera on the adapter plate to be centered with respect to the camera head.

The upper surface of the adapter plate has a dovetail groove 65 which extends axially forwards from the rear edge of the adapter plate and decreases uniformly in width towards the front. The groove 65 is adapted to receive a wedge-shaped dovetail slide 66 which can be secured to the base of a camera. The slide 66 can be jammed in the groove 65 by forcing it forwards along the groove. A conventional locking bar 67 extends through transverse grooves in the adapter plate and the slide 66 to lock in position the slide and any camera secured to the slide. The bar 67 is in turn locked in position by a pin 68 in the conventional manner.

I Claim:

1. A tilt-table device for a camera, comprising a base adapted to be mounted on a support, an intermediate member pivotally connected to the base about a substantially horizontal first axis, a table pivotally connected to the intermediate member about a second axis spaced from and substantially parallel to the first axis, the table being adapted to support a camera, locking means operable selectively either to lock the intermediate member to the base to prevent relative angular movement therebetween about the first axis or to lock the intermediate member to the table to prevent relative angular movement therebetween about the second axis, and tilting means operable to pivot the table about the second axis when the intermediate member is locked to the base by the locking means, and to pivot both the table and the intermediate member about the first axis when the intermediate member is locked to the table by the locking means.

2. A tilt-table device as claimed in claim 1, wherein the tilting means comprises an expandable jack disposed between and reacting against the base and the table with the line of action of the jack passing between said first and second axes.

3. A tilt-table device as claimed in claim 1, wherein the base is formed with a track thereon, and the tilting means comprises a carriage mounted on the track, screw means for moving the carriage along the track, and a lift arm pivotally connected to the table and carriage, the track being arranged so that, upon movement of the carriage along the track in one direction, the lift arm exerts on the table a thrust the line of action of which passes between said first and second axes.

4. A tilt-table device as claimed in claim 3, wherein the screw means comprises a screw-threaded rod extending along the track and means for rotating said rod, and the carriage comprises a screw-threaded nut mounted on the rod and wheels mounted on the nut and in rolling engagement with the track.

5. A tilt-table device as claimed in claim 4 and including two lift arms pivotally mounted on opposite sides of the carriage.

6. A tilt-table device as claimed in claim 3, wherein the base is shaped to form a well which accommodates the carriage and at least part of the screw means, the bottom of the well being inclined relative to the top surface of the base and forming the track for the carriage.

7. A tilt-table device as claimed in claim 1, wherein the locking means is mounted on the intermediate member and movable in one direction into locking engagement with the base to prevent relative angular movement between the intermediate member and the base about said first axis, and the locking means is movable in the opposite direction into locking engagement with the table to prevent relative angular movement between the intermediate member and the table about said second axis.

8. A tilt-table device as claimed in claim 7, wherein the locking means comprises a bar axially slidable on the intermediate member, the base is provided with an aperture or recess aligned with the bar when the intermediate member is at a particular setting relative to the base, said aperture or recess being adapted to receive one end of the bar upon movement of the bar in one direction when the intermediate member and base are in said setting so as to lock the intermediate member to the base, and the table is provided with an aperture or recess aligned with the bar when the table is at a particular setting relative to the intermediate member, the aperture or recess in the table being adapted to receive the other end of the bar upon movement of the bar in the opposite direction when the intermediate member and table are in said setting so as to lock the intermediate member to the table.

9. A tilt-table device as claimed in claim 7, wherein the intermediate member comprises a platelike structure having one end pivotally connected to the base about said first axis and the other end pivotally connected to the table about said second axis, and the table, intermediate member and base are superimposed upon each other when the device is in the collapsed condition with the intermediate member resting on the base and the table resting on the intermediate member.

10. A tilt-table device as claimed in claim 9, wherein the intermediate member is formed with two apertures arranged one adjacent each end thereof and a guide track extending between said apertures, the base member is provided with an upstanding lug arranged to engage in the aperture remote from the first axis when the intermediate member is collapsed onto the base, the table is provided with a depending lug arranged to engage in the aperture remote from the second axis when the table is collapsed onto the intermediate member, each lug having a bore which is axially aligned with the guide track when the device is in the collapsed condition, and the locking means comprises a bar mounted in said guide track and mechanism for sliding the bar along the guide track, the bar being movable in one direction along the track when the device is in the collapsed condition to engage one end of the bar in the bore in the lug on the base, thereby locking the intermediate member to the base, and being movable in the opposite direction along the track when the device is in the collapsed condition to engage the other end of the bar in the bore in the lug on the table, thereby locking the intermediate member to the table.

11. In a camera head for supporting a television or film camera, a tilt-table device as claimed in claim 1, arcuate guide rails on the base of the device, the guide rails being centered about a common axis substantially parallel to said first and second axes, roller means engaging the guide rails and supporting the base on the frame of the camera head for angular movement about said common axis, and means for adjusting the angle of tilt of the base about said common axis.